(12) United States Patent
Daswani et al.

(10) Patent No.: US 9,894,096 B1
(45) Date of Patent: *Feb. 13, 2018

(54) BEHAVIORAL SCANNING OF MOBILE APPLICATIONS

(71) Applicant: Twitter, Inc., San Francisco, CA (US)

(72) Inventors: Neilkumar Murli Daswani, San Jose, CA (US); Ameet Ranadive, Fremont, CA (US); Shariq Rizvi, Fremont, CA (US); Michael Gagnon, San Jose, CA (US); Tufan Demir, Santa Clara, CA (US); Gerald E. Eisenhaur, Emeryville, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,806

(22) Filed: Jul. 29, 2014

Related U.S. Application Data

(63) Continuation of application No. 13/458,982, filed on Apr. 27, 2012, now Pat. No. 8,806,647.

(60) Provisional application No. 61/479,841, filed on Apr. 27, 2011.

(51) Int. Cl.
*G06F 12/14* (2006.01)
*H04L 29/06* (2006.01)
*H04L 9/32* (2006.01)
*H04M 1/725* (2006.01)

(52) U.S. Cl.
CPC ...... *H04L 63/145* (2013.01); *H04M 1/72522* (2013.01)

(58) Field of Classification Search
CPC ..................... H04L 63/145; H04M 1/72522

USPC ..... 726/23, 25; 713/161, 165, 168, 187, 188
See application file for complete search history.

(56) References Cited

U.S. PATENT DOCUMENTS

| | | | |
|---|---|---|---|
| 7,664,626 B1 | 2/2010 | Ferrie | |
| 8,443,439 B2 | 5/2013 | Lamastra et al. | |
| 8,499,353 B2 | 7/2013 | Lockhart et al. | |
| 8,510,838 B1 | 8/2013 | Sun et al. | |
| 9,009,834 B1* | 4/2015 | Ren | G06F 21/10 709/224 |
| 2008/0155334 A1* | 6/2008 | Mills | G06F 11/261 714/37 |
| 2009/0037881 A1* | 2/2009 | Christy | G06F 11/3684 717/124 |
| 2009/0144823 A1 | 6/2009 | Lamastra et al. | |

(Continued)

OTHER PUBLICATIONS

United States Advisory Action, U.S. Appl. No. 13/458,982, dated Dec. 24, 2013, 3 pages.

(Continued)

*Primary Examiner* — Aravind K Moorthy
(74) *Attorney, Agent, or Firm* — Fenwick & West LLP

(57) ABSTRACT

Behavioral analysis of a mobile application is performed to determine whether the application is malicious. During analysis, various user interactions are simulated in an emulated environment to activate many possible resulting behaviors of an application. The behaviors are classified as hard or soft signals. A probability of the application being malicious is determined through combining soft signals, and the application is classified as malicious or non-malicious. Users of the application, the developer of the application, or a distributor of the application are notified of the application classification to enable responsive action.

30 Claims, 6 Drawing Sheets

(56) References Cited

U.S. PATENT DOCUMENTS

| | | | |
|---|---|---|---|
| 2009/0203368 A1* | 8/2009 | Marsyla | G06F 9/45512 455/418 |
| 2010/0003923 A1* | 1/2010 | McKerlich | H04L 12/14 455/67.11 |
| 2010/0333088 A1 | 12/2010 | Rogel et al. | |
| 2011/0219035 A1* | 9/2011 | Korsunsky | G06F 17/30 707/784 |
| 2012/0102087 A1 | 4/2012 | Chor | |
| 2012/0106427 A1* | 5/2012 | Nakae | H04L 12/1868 370/312 |
| 2012/0155292 A1* | 6/2012 | Zazula et al. | 370/252 |
| 2012/0266244 A1* | 10/2012 | Green | G06F 21/566 726/24 |
| 2012/0272317 A1* | 10/2012 | Rubin | G06F 21/552 726/23 |
| 2013/0014262 A1* | 1/2013 | Lee et al. | 726/24 |
| 2013/0091570 A1 | 4/2013 | McCorkendale et al. | |
| 2013/0097706 A1* | 4/2013 | Titonis | G06F 21/56 726/24 |

OTHER PUBLICATIONS

United States Office Action, U.S. Appl. No. 13/458,982, dated Nov. 6, 2013, 7 pages.
United States Office Action, U.S. Appl. No. 13/458,982, dated Apr. 26, 2013, 11 pages.

\* cited by examiner

BEHAVIORAL SCANNING OF MOBILE APPLICATIONS

CROSS-REFERENCE TO RELATED APPLICATION

This application is a continuation of U.S. patent application Ser. No. 13/458,982, filed Apr. 27, 2012, which claims the benefit of U.S. Provisional Application No. 61/479,841, filed Apr. 27, 2011, the contents of which is hereby incorporated by reference in its entirety.

BACKGROUND

Field of Disclosure

The disclosure generally relates to the field of malware detection, in particular to detecting malware in computing applications.

Description of the Related Art

Malware detection is commonly accomplished by looking for certain signatures within binaries. However, this method of detection can be negated by a malware generator generating variants of a piece of malware. These variants can be scanned with known antivirus engines to ensure that no malware signature match is made. Unmatched variants of malware can then be released into the wild through applications and infect mobile devices. In one example, an attacker might download an application free from malware from an application distribution server. The attacker injects the application with malware and makes the application with injected malware available on the application distribution server.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
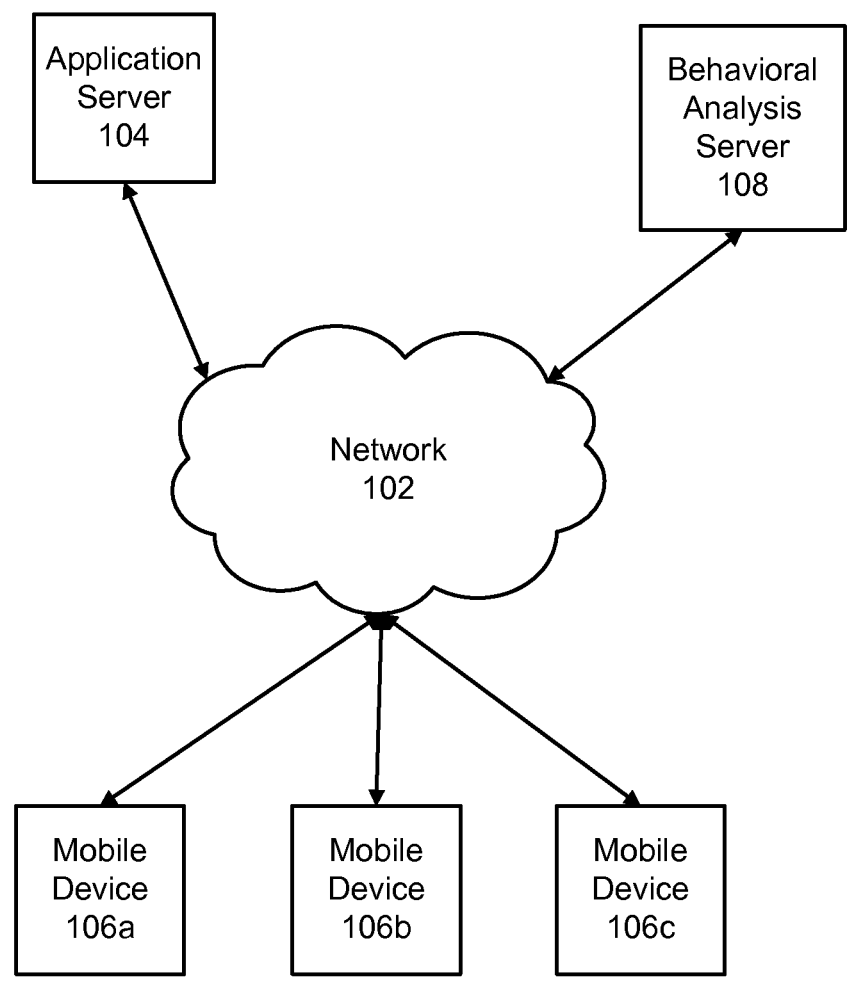
FIG. 1 is a block diagram illustrating a computing environment for behavioral analysis of application according to one embodiment of the present disclosure.

The computing environment described herein enables behavioral scanning of mobile applications for malware. The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

Configuration Overview

Configurations as disclosed allow for malware detection in computing environments, for example, mobile devices (or mobile computing devices). Mobile devices, as further disclosed herein, include smartphones and tablet computers that can be configured to download and install applications (referred to as "apps") from an application store that is online or otherwise on the web. In one embodiment, the disclosed configurations detect uses non-behavioral malware detection systems and techniques to analyze and detect whether installation of a particular application would introduce malware on the mobile computing device.

As disclosed herein, instead of, or in addition to, non-behavioral malware detection, behavioral detection also can be performed to observe the actions of an application and the device on which the application is running In one example embodiment, the behavioral detection is performed on a software emulation platform. In this configuration, the system is structured to customize the emulated environment, record the observed output, analyze the practical significance of the observed output, and optionally provide suggested course of action, e.g., avoid download, articulate impact on mobile device, etc. For example, through the disclosed configuration, the analyzed output may indicate that download and installation of a particular application would cause a particular impact on mobile device resources, for example, increased processor utilization, increased memory utilization, or increased communication radio utilization, and/or corresponding impact such as decreased battery life.

In one embodiment, mobile applications are examined as part of their submission to an application marketplace, e.g., an online marketplace, prior to the application being made available to end users. This may be done at the request of the marketplace owner, application developer, or a mobile phone carrier. The application is examined to determine whether it exhibits behavioral traits that may be indicative of maliciousness or other behavior that may negatively impact operation of a computing device. Applications may also be tested periodically to detect malicious behavior that activates after a certain number of uses, after a certain date, or in any other conditions that change over time. In one embodiment, behavioral analysis is performed, or more likely to be performed, on applications that are popular, recently uploaded, recently updated, uploaded by an entity without a history of malware free software, or other appropriate criteria.

During scanning, various user interactions are simulated to activate many possible behaviors of an application when it is running on a computing device. Scanning may be performed for different amounts of time both to allow a greater amount of simulated user interactions and to activate behaviors that may occur only after the mobile device running the application has been asleep, the screen has been dimmed, or any other temporally affected behavior has occurred.

System Environment

Referring to FIG. 1, the computing environment for behavioral analysis of applications comprises one or more application servers 104, mobile devices (or mobile computing devices) 106a-c, behavioral analysis servers 108, and a network 102. An example computing device architecture suitable for the various components in the computing environment of FIG. 1 is further described with respect to FIG. 6. It is noted that the network 102 may be, for example, in the Internet, and can be accessed through wired or wireless connection.

Figure 6:
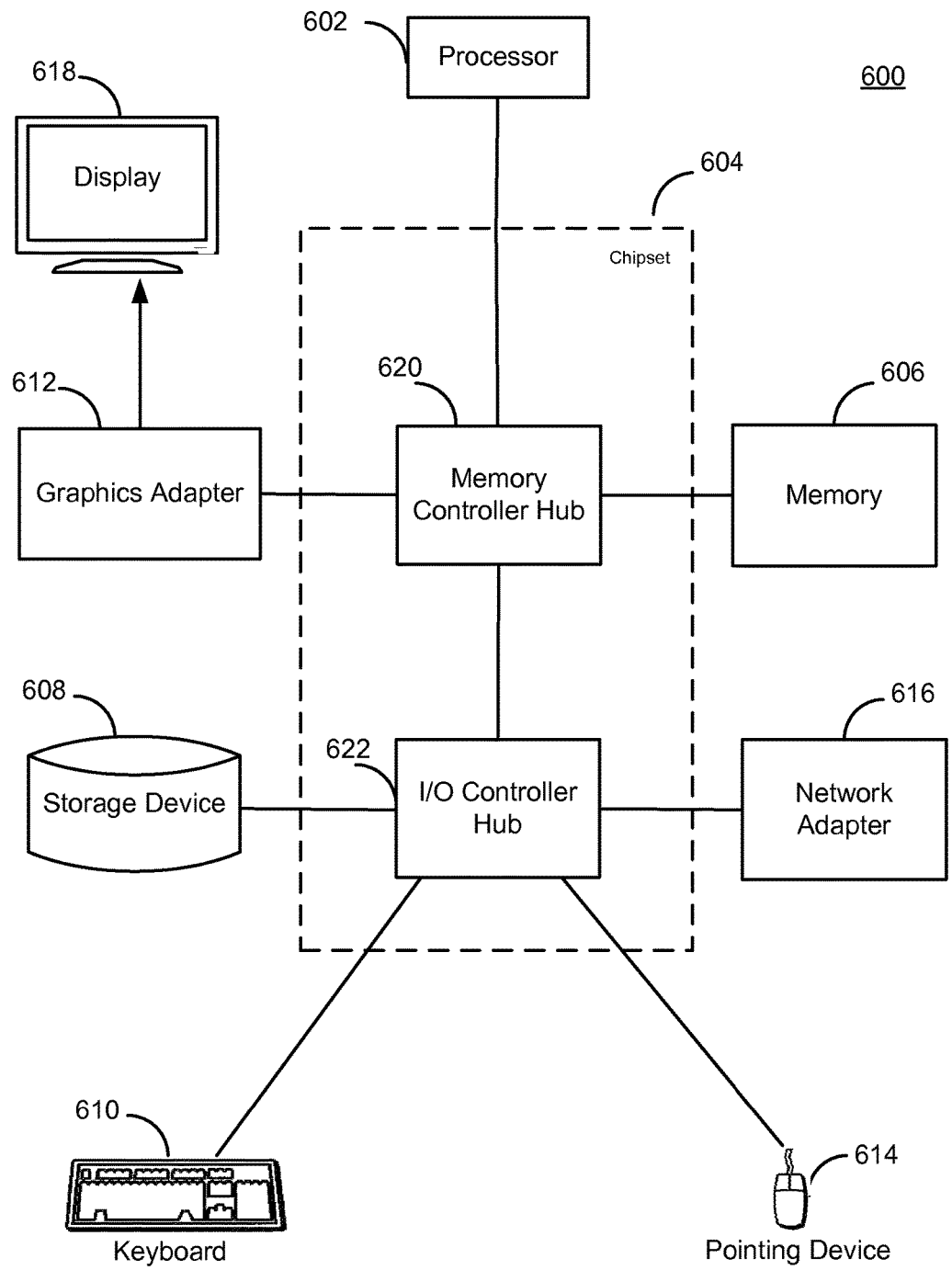
FIG. 6 is a block diagram illustrating an example of a computer for use in the computing environment shown in FIG. 1 according to one embodiment of the present disclosure.

Each of the mobile devices 106a-c (collectively referred to as "mobile device 106") is a computing device with a processor and a memory, e.g., as further described with FIG. 6, that provides users with an interface to receive and interact with content. Examples of clients 106 include a smartphone, netbook, a laptop or tablet. For ease of discussion and understanding, the configurations herein will be described in the context of mobile device 106, although it is noted that the principles described herein with respect to the mobile device 106 can also be applied to larger computing system such as a desktop computer or server computer.

Mobile device 106 typically includes an operating system, for example the ANDROID operating system by GOOGLE INC. of Mountain View, Calif., WINDOWS PHONE by MICROSOFT CORPORATION of Redmond, Wash., BLACKBERRY OS by RESEARCH IN MOTION LIMITED of Waterloo, Ontario, Canada, KINDLE FIRE by AMAZON, INC. of Seattle, Wash., or iOS by APPLE INC. of Cupertino, Calif. Mobile device 106 is configured to run various applications which may be downloaded over the network 102. The applications may or may not contain malware causing nefarious actions to be performed on the mobile device 106. In one embodiment, applications may be downloaded by the mobile device 106 from the application server 104 over the network 102.

The application server 104 is a computing device configured to distribute applications to one or more mobile devices. An example computing device is described with respect to FIG. 6. For example, the application server 104 may be an application store such as GOOGLE PLAY also by GOOGLE INC., the APP STORE by APPLE INC., BLACKBERRY APP WORLD by RESEARCH IN MOTION, or APPSTORE FOR ANDROID by AMAZON INC. In one embodiment, the application server 104 receives an application over the network 102 and makes the application available for distribution to the mobile device 106. The application server 104 is configured so that it may be notified that an application is malicious. When notified, the application server 104 may perform various remedial actions, for example, removing the application from availability on the app store site, erasing (or requesting authorization to erase) the infected device of a user who has downloaded the application, deleting or disabling the application from the infected device of the user, or quarantining the infected device from the network 102. Such a quarantine may be complete, or involve a reduction in services until the issue is rectified.

The behavioral analysis server 108 is a computing device configured to analyze applications for malware. In one embodiment, the behavioral analysis server 108 receives an application from the application server 104 prior to the application server 104 making the application available to the mobile device 106. Alternatively, applications may be analyzed after distribution to the mobile device 106 has occurred. In one embodiment, an application is installed and run on software emulating the operating system of the mobile device 106. Various input permutations are tested to analyze the resulting behavior of the application. The resulting behavior may include signals indicating the application is likely to contain malware. In one embodiment, soft signal and hard signal classifications are assigned to behaviors to indicate a likelihood that a certain behavior is due to malware on the application being tested. Additionally, in one embodiment, detected soft signals and hard signals can be combined to determine an overall likelihood of the tested application containing malware.

Upon reading this disclosure, one of ordinary skill in the art will understand that the description above includes three mobile devices 106a-c, one application server 104 and one behavioral analysis server 108 for the purposes of illustration. In other embodiments, any number of each of these components may be included in the computing environment illustrated by FIG. 1

Behavioral Analysis Server Configuration

Figure 2:
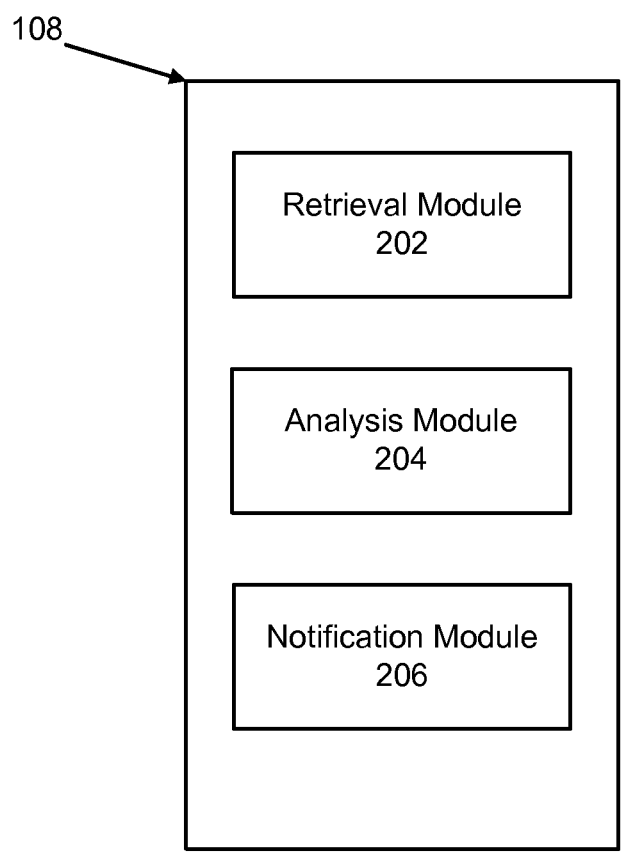
FIG. 2 is a block diagram illustrating a behavioral analysis server according to one embodiment of the present disclosure.

FIG. 2 is a block diagram illustrating the behavioral analysis server 108 according to one example embodiment of the present disclosure. The behavioral analysis server 108 comprises a retrieval module 202, an analysis module 204 and a notification module 206.

The retrieval module 202 receives applications from the application server 104 to allow the behavioral analysis server 108 to analyze an application for malware. In one embodiment, an application is automatically retrieved by the retrieval module 202 by scanning applications available from the application server 104 for applications that have not yet been analyzed by the behavioral analysis server 108 and downloading those applications. Applications may also be transmitted to one or more mobile devices 106 prior to analysis by the behavioral analysis server 108. If an application is found to be malicious after it has been downloaded to a mobile device 106, the behavioral analysis server 108 may disable the application on the mobile device 106, provide notification to the user of the mobile device 106, or take other appropriate action. In one embodiment, an application is sent to the behavioral analysis server 108 by the application server 104 in response to a mobile device 106 downloading the application. In another embodiment, the application server 104 is configured to transmit an application to the behavioral analysis module 108 for analysis before making the application available to the mobile device 106.

The analysis module 204 performs behavioral analysis on an application retrieved by the retrieval module 202. In one embodiment, both static and behavioral analyses are performed by the analysis module 204 to properly assess whether an application contains malware. The application is run in an emulated software platform, and a wide range of input permutations are performed in order to monitor the resulting behavior of the application. An emulator can be built from a stock mobile device emulator, and modified to form a mobile sandbox. The sandbox provides an emulated environment corresponding to a device and is suitable for testing an app without installing on the particular device. The sandbox includes hooks for key application programming interfaces (APIs) that a mobile application might communicate through, e.g., calls sent or received. Examples of APIs include those that are used to access a file system, access contacts in an address book, interface with an SMS text subsystem, a interface with a wireless fidelity (WiFi) system, interface with a telephony system, or enable or disable a camera. In one embodiment, the sandbox is also configured to observe an application's network behavior, graphical user interface and other aspects for black-box monitoring, in addition to white-box monitoring of API calls.

In one embodiment, the sandbox uses an event generator or user interface exerciser that generates events such as touch screen interaction, microphone and speaker volume level button pressing, ringer volume or vibration button pressing, and any other possible user interaction. The event generator looks at the manifest for an application and looks at what event handlers it processes to determine which actions should be simulated in behavioral analysis. Behaviors may be classified as unsuspicious, soft signals, or hard signals. In one embodiment, these classifications are assigned based on a behavior's likelihood of being performed due to malware in the application. Additionally, multiple classified behaviors may be combined to determine an overall risk or likelihood of malware being present in the application. The analysis module 204 is discussed in more detail in FIG. 3.

The notification module 206 is configured to take action based on the results of the analysis module 204. For example, if an application is determined to likely contain malware, the application server 104, or an administrator of the application server 104, may be notified of the malware. Additionally, the notification module 206 may notify mobile devices that an application has been found to contain malware. In one embodiment, the notification may be limited to those mobile devices that have installed the infected application. The notification may also include instructions on how to eliminate or reduce the threat posed by the newly detected malware.

Figure 3:
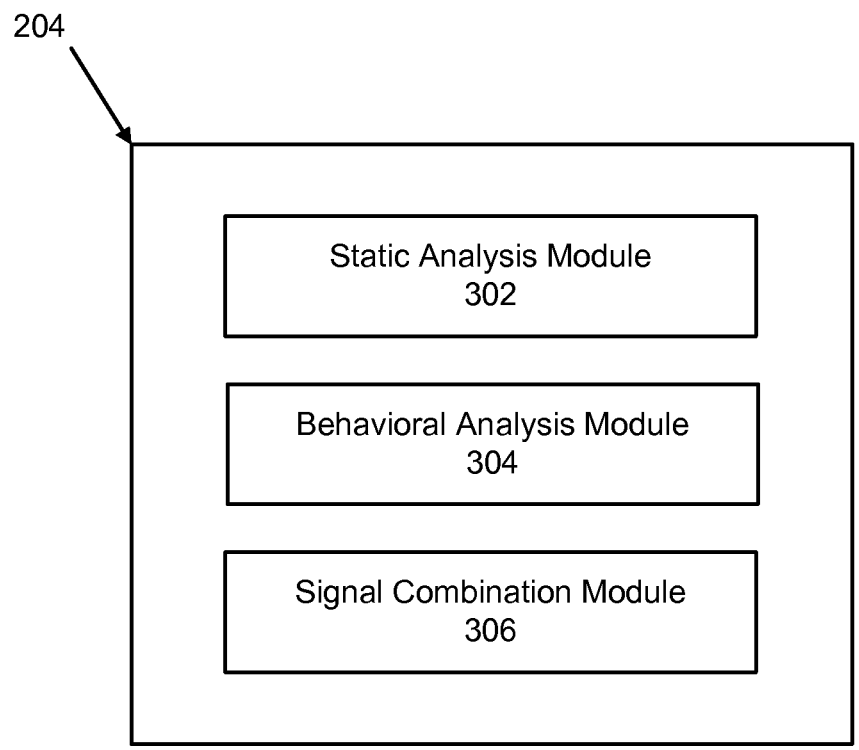
FIG. 3 is a block diagram illustrating an analysis module according to one embodiment of the present disclosure.

Turning now to FIG. 3, the analysis module 204 is further described. The analysis module 204 comprises a static analysis module 302, a behavioral analysis module 304 and a signal combination module 306.

The static analysis module 302 performs a static analysis on a sample of an application to enable full behavioral analysis of the application. In one embodiment, the manifest of the application is analyzed to determine all events which the application registers for when it will be executing. Events correspond to objects sent to an application to inform it of user or system actions. The events may include multi-touch events, accelerometer or GPS events, remote control events or other inputs triggered through user action or system hardware. In one embodiment, an application may request permission to utilize certain events during runtime. These requested event types can then be targeted during the input simulation portion of behavioral analysis. In certain operating systems, an application registers for actions which the application can be granted access to. By determining all of these events, the behavioral analysis module 304 can attempt to place an emulated mobile device in various states through simulated user interactions. The states include an unsuspicious state or one of two levels of suspicious states. With respect to the suspicious states, the behavior analysis module 304 determines what events might cause suspicious actions to be performed by the application and the actions or behaviors can be classified as hard signals or soft signals, which are further described herein.

In addition, the static analysis module 302 determines the emulator environment that should be used to properly test the behavior of an application. In one embodiment, the emulator environment is controlled for operating system and operating system version of the mobile device, other applications installed, and hardware features or revisions. The emulator environment can retrieve and store multiple versions (and if applicable, release or revision level) of operating systems and mobile applications to ensure that a wide variety of platform configurations can be simulated during behavioral testing. Certain applications, or versions of operating systems or applications may need to be installed for an application to exhibit behavior that may be classified as a hard or soft signal and therefore indicative of malware being present. Determining which versions of software should be installed can be performed through static analysis of the application being tested, random testing, or through notification from those who have experienced malicious behavior. In one embodiment, the emulated environment includes seed information such as contacts in an address book, seeded global positioning system (GPS) locations, internet history, and other information better simulating an actual user's device. This better enables to the emulator to make an application exhibit a wide range of behaviors during behavioral analysis.

Behavioral analysis module 304 performs a series of steps to recognize hard and soft signals indicative of the application containing malware. An image of the emulated environment determined in static analysis is loaded allowing the application to be tested under proper conditions. A sample of the application is then installed on the emulated environment and the application is started. A user interface exerciser, for example, MONKEY by GOOGLE INC. may be used to generate a stream of events that simulate user input and various system level events. In one embodiment, the stream of inputs or events is generated randomly. Alternatively, the stream of user inputs may be directed to ensure that all application registered events and permissions identified during static analysis are triggered during runtime. Static analysis module 302 determines what events an application accepts from a user. For example, if a username and password are solicited in a dialog box, the user interface exerciser provides a username and password and takes an action through the dialog box to submit (e.g., ok or enter). In one embodiment, a debugging utility, such as STRACE is utilized to monitor system calls made by the application. This enables all system calls, actions, and other behaviors of the application to be stored during behavioral analysis. The observed behaviors may then be analyzed and classified as hard signals or soft signals.

In one embodiment, multiple behavioral analyses are performed in succession, using the results of a previous test to modify the user inputs which are simulated by the user interface exerciser. For example, if a large number of soft signals are observed after accessing a certain portion of the application which receives address book information, another behavioral analysis may be performed with user inputs focused on provoking address book interaction. This may be repeated any number of times to better assess the maliciousness of an application.

Signal combination module 306 combines multiple behaviors signals to determine an overall likelihood that an application is malicious. In one embodiment, some system calls or actions simulated in the emulated environment may be classified as soft signals or hard signals. In one embodiment, soft signals comprise system calls or actions which have an associated probability of the application containing malware. Hard signals comprise system calls or actions that are by definition malicious actions, or associated with a probability of the application containing malware, the probability exceeding a hard signal threshold. For example, a soft signal may be accessing an address book on the mobile device. This action may be used for malicious purposes, but is often benign. In one embodiment, a soft signal has a higher probability of maliciousness if similar applications are unlikely to perform a similar action. A soft signal of accessing address book information may also be assigned an increased probability of maliciousness based on the amount of address book entries accessed or the pattern in which entries are accessed. For example, iteratively retrieving every address from an address book may be assigned a higher probability of maliciousness. On the other hand, contacting an internet protocol (IP) address associated with a known malicious botmaster may be classified as a hard signal due to the small probability of benign software performing such an action.

In one embodiment, if a hard signal is observed in an application, the application is classified as malicious. This may be due to a probability of malicious content exceeding a predefined threshold or threshold value of what comprises or corresponds with malicious content. Alternately, it may be due to being innate in the action performed by the hard signal.

Likewise if one or more independent soft signals are observed, each of the soft signals has their own probability of indicating that an application is malicious. According to one embodiment, the probability of maliciousness, X, that an application is malicious when a single independent soft signal is observed is shown in equation (1) below, where P is the overall probability that any application contains malware without specific information about the application, D is the detection rate or probability that the soft signal is observed for a malicious application, and F is the false positive rate or probability that the soft signal is observed for a legitimate application.

$$X=(D*P)/(D*P+F*(1-P)) \quad (1)$$

The equation indicates that both the detection rate and false positive rate of observed soft signals are taken into account. A signal with a high detection rate and a low false positive rate increases the probability of maliciousness when the signal is observed. The probability of maliciousness of multiple soft signals may then be taken into account to determine a combined probability of maliciousness. It should be noted that equation 1 and the related discussion is merely an example of probability calculations that may be used if the soft signals are all independent. In one embodiment, the application is identified as malicious if the combined probability of maliciousness exceeds a threshold. In one embodiment, the threshold is the same threshold of probability used to classify an individual signal as a hard signal. Alternatively, the probability of maliciousness threshold for a hard signal may be higher or lower than the combined probability of maliciousness threshold. In one embodiment, soft signals are not independent, but rather their associated probability of maliciousness varies based on other soft signals that are observed in an application.

Figure 4:
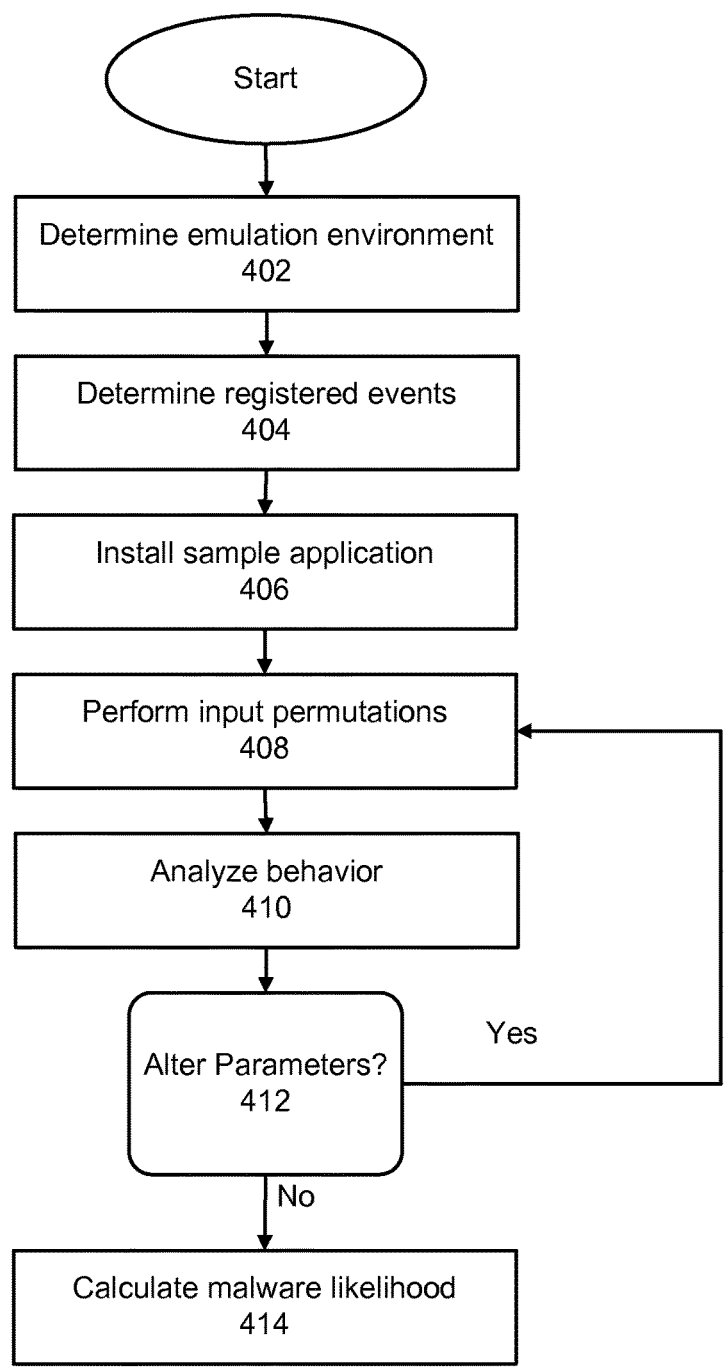
FIG. 4 is a flow diagram illustrating a method for performing malware detection analysis according to one embodiment of the present disclosure.

Referring now to FIG. 4, a flow diagram illustrates an example method for performing application malware analysis according to one embodiment of the present disclosure. After receiving an application sample for analysis, the analysis module 204 determines 402 the emulation environment in which the application should be tested. The manifest of the application is also analyzed by the analysis module 204 to determine 404 events for which the application is registered. The sample application is then installed 406 on the emulated image of the mobile device conforming to the previously determined emulation environment. Pseudo-random streams of user events such as clicks, touches, gestures, and various system-level events are generated to perform 408 a wide variety of input permutation in the emulated software and the resulting behavior is logged. Analysis module 204 then analysis 410 the recorded behavior to identify behaviors which may be classified as soft signals and hard signals. Based on results, analysis module 204 may decide that the test should be performed again with altered 412 parameters. If this occurs, step 408 is performed once again on the application with a new set of generated user events. Otherwise, analysis module 204 calculates 414 the likelihood of the application sample containing malware based on the soft and hard signals identified in recorded behaviors. The result of analysis may be reported to the application server 104 and/or the mobile device 106 to inform whether an application is malicious and, optionally, the probability that the application is malicious.

Figure 5:
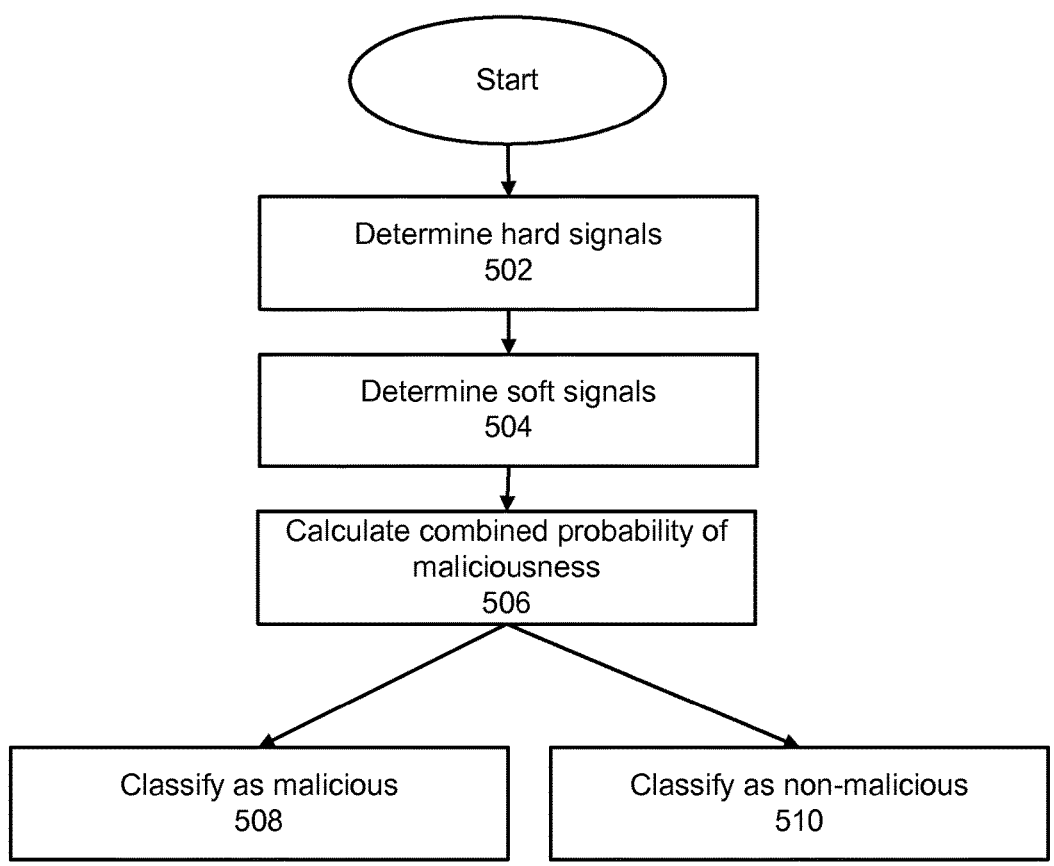
FIG. 5 is a flow diagram illustrating a method for combining hard and soft signals to determine a likelihood of malware according to one embodiment of the present disclosure.

FIG. 5 is a flow diagram illustrating an example method for combining hard signals and soft signals to determine a likelihood of malware according to one embodiment of the present disclosure. After the analysis module 204 observes behaviors and classifies hard and soft signals, the analysis module 204 proceeds to assess the likelihood of an application being malicious based on hard and soft signal infection rates and a false positive rate. Analysis module 204 determines 502 observed hard signal behaviors and determines a probability of maliciousness for each of the hard signals. Similarly, analysis module 204 determines 504 observed soft signal behaviors and determines a probability of maliciousness for each of the soft signals. In one embodiment, as previously discussed, individual hard signals have a probability of maliciousness high enough to classify the application as malicious. On the other hand, the probability of maliciousness for each of the observed soft signals is combined to calculate 506 a combined probability of maliciousness. If hard signal is observed, or if the combined probability of maliciousness exceeds a maliciousness threshold, the application is classified 508 as malicious. If no hard signal is observed, and if the combined probability of maliciousness fails to exceed the maliciousness threshold, the application is classified as non-malicious.

Example Computing Architecture

The entities shown in FIGS. 1-5 are implemented using one or more computers. A computer used to implement these entities may take on a variety of form factors. For example, in on embodiment, mobile device 106 is a smartphone configured to run applications downloaded over the network 102. FIG. 6 is a high-level block diagram illustrating an example computer 600. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, or other type of pointing device, and is used in combination with the keyboard 610 to input data into the computer system 600. The graphics adapter 612 displays images and other information on the display 618. The network adapter 616 couples the computer system 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIGS. 1-5 can vary depending upon the embodiment and the processing power required by the entity. For example, the behavioral analysis server 108 might comprise multiple blade servers working together to provide the functionality described herein. The computers 600 can lack some of the components described above, such as keyboards 610, graphics adapters 612, and displays 618.

Additional Considerations

The disclosed configurations beneficially provide behavioral malware detection that can be applied with or without static malware detection to evaluate whether a particular software application is potentially harmful malware when installed on a mobile device. In one example embodiment, the behavioral detection is performed on a software emulation platform. In this configuration, the system is structured to customize the emulated environment, record the observed output, analyze the impact of the observed output, and optionally provide suggested course of action.

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions, like the processes described in FIGS. 4-5, are presented in terms of algorithms and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the system, like the ones described in FIGS. 2-3, may be further divided into logical modules. One of ordinary skill in the art will recognize that a computer or another machine with instructions to implement the functionality of one or more logical modules is not a general purpose computer. Instead, the machine is adapted to implement the functionality of a particular module. Moreover, the machine embodiment of the system physically transforms the electrons representing various parts of content and data representing user interaction with the content into different content or data representing determined resonance.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for detecting potential malware using behavioral scanning analysis through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for determining a suitability of a mobile application for distribution in a mobile application marketplace, the method comprising:
   receiving a mobile application for distribution in a mobile application marketplace;
   performing a static analysis on the mobile application to identify a set of registered application permissions of the mobile application, and determine one or more events that simulate user interaction on the client device based on the identified registered application permissions;
   selecting an emulated environment configured to execute the mobile application based on the identified registered application permissions;
   executing the mobile application in the selected emulated environment, the emulated environment simulating a mobile device;
   recording behaviors of the simulated mobile device in response to providing the one or more events to the mobile application;
   classifying the mobile application as malicious or non-malicious based on the recorded behaviors; and
   determining, based on the classification, whether to approve or reject the mobile application for distribution in the mobile application marketplace.

2. The method of claim 1, wherein recording behaviors of the simulated mobile device comprises:
   emulating one or more common user behaviors associated with the mobile application;
   varying one or more temporal qualities relating to the emulated user behaviors, including at least one of:
   the number of accesses of the mobile application,
   the duration of a particular session of accessing the mobile application; and
   inputting the emulated user behaviors into the mobile application within the emulated environment of the mobile device.

3. The method of claim 2, wherein the emulated user behaviors are input independently to analyze a response of the mobile application to the emulated user behaviors.

4. The method of claim 2, wherein the emulated user behaviors are input in combination to analyze a response of the mobile application to the emulated user behaviors.

5. The method of claim 2, further comprising:
   recording a response of the mobile application to the inputted emulated user behaviors;
   determining a second set of emulated user behaviors based on the response of the mobile application;
   inputting the second set of emulated user behaviors into the mobile application; and
   analyzing a second response of the mobile application to the second set of user behaviors.

6. The method of claim 2, wherein the emulated user behaviors trigger the registered application permissions using at least one of the emulated user inputs.

7. The method of claim 1, wherein the emulated environment comprises one or more unrelated mobile applications executing concurrently alongside the mobile application.

8. The method of claim 7, further comprising:
   analyzing an effect of the one or more unrelated mobile applications on the mobile application being tested, the effect comprising at least one of:
   a change in utilization of a processing resource of the emulated environment, and
   a change in utilization of a memory resource of the emulated environment.

9. The method of claim 1, wherein the emulated environment comprises an emulated mobile operating system and applications installed on the emulated operating system.

10. The method of claim 1, wherein performing the static analysis on the application comprises analyzing the application manifest.

11. A computer program product for determining a suitability of a mobile application for distribution in a mobile application marketplace, the computer program product comprising a non-transitory computer-readable storage medium containing computer program instructions for:
   receiving a mobile application for distribution in a mobile application marketplace;
   performing a static analysis on the mobile application to identify a set of registered application permissions of the mobile application, and determine one or more events that simulate user interaction on the client device based on the identified registered application permissions;
   selecting an emulated environment configured to execute the mobile application based on the identified registered application permissions;
   executing the mobile application in the selected emulated environment, the emulated environment simulating a mobile device;
   recording behaviors of the simulated mobile device in response to providing one or more events to the mobile application;
   classifying the mobile application as malicious or non-malicious based on the recorded behaviors; and
   determining, based on the classification, whether to approve or reject the mobile application for distribution in the mobile application marketplace.

12. The computer program product of claim 11, wherein recording behaviors of the simulated mobile device comprises:
  emulating one or more common user behaviors associated with the mobile application;
  varying one or more temporal qualities relating to the emulated user behaviors, including at least one of:
    the number of accesses of the mobile application,
    the duration of a particular session of accessing the mobile application; and
  inputting the emulated user behaviors into the mobile application within the emulated environment of the mobile device.

13. The computer program product of claim 12, wherein the emulated user behaviors are input independently to analyze a response of the mobile application to the emulated user behaviors.

14. The computer program product of claim 13, wherein the emulated environment comprises an emulated mobile operating system and applications installed on the emulated operating system.

15. The computer program product of claim 12, wherein the emulated user behaviors are input in combination to analyze a response of the mobile application to the emulated user behaviors.

16. The computer program product of claim 12, further comprising:
  recording a response of the mobile application to the inputted emulated user behaviors;
  determining a second set of emulated user behaviors based on the response of the mobile application;
  inputting the second set of emulated user behaviors into the mobile application; and
  analyzing a second response of the mobile application to the second set of user behaviors.

17. The computer program product of claim 11, wherein the emulated environment comprises one or more unrelated mobile applications executing concurrently alongside the mobile application being tested within the emulated environment.

18. The computer program product of claim 17, further comprising:
  analyzing an effect of the one or more unrelated mobile applications on the mobile application being tested, the effect comprising at least one of:
    a change in utilization of a processing resource of the emulated environment, and
    a change in utilization of a memory resource of the emulated environment.

19. The computer program product of claim 11, wherein performing the static analysis on the application comprises analyzing the application manifest.

20. The computer program product of claim 11, wherein the emulated user behaviors trigger the registered application permissions using at least one of the emulated user inputs.

21. A system comprising:
  a computer processor; and
  a non-transitory computer-readable storage medium containing computer program instructions executed by the computer processor for:
    receiving a mobile application for distribution in a mobile application marketplace;
    performing a static analysis on the mobile application to identify a set of registered application permissions of the mobile application, and determine one or more events that simulate user interaction on the client device based on the identified registered application permissions;
    selecting an emulated environment configured to execute the mobile application based on the identified registered application permissions;
    executing the mobile application in the selected emulated environment, the emulated environment simulating a mobile device;
    recording behaviors of the simulated mobile device in response to providing one or more emulated inputs to the mobile application;
    classifying the mobile application as malicious or non-malicious based on the recorded behaviors; and
    determining, based on the classification, whether to approve or reject the mobile application for distribution in the mobile application marketplace.

22. The system of claim 21, wherein recording behaviors of the simulated mobile device comprises:
  emulating one or more common user behaviors associated with the mobile application;
  varying one or more temporal qualities relating to the emulated user behaviors, including at least one of:
    the number of accesses of the mobile application,
    the duration of a particular session of accessing the mobile application; and
  inputting the emulated user behaviors into the mobile application within the emulated environment of the mobile device.

23. The system of claim 22, wherein the emulated user behaviors are input independently to analyze a response of the mobile application to the emulated user behaviors.

24. The system of claim 22, wherein the emulated user behaviors are input in combination to analyze a response of the mobile application to the emulated user behaviors.

25. The system of claim 22, further comprising:
  recording a response of the mobile application to the inputted emulated user behaviors;
  determining a second set of emulated user behaviors based on the response of the mobile application;
  inputting the second set of emulated user behaviors into the mobile application; and
  analyzing a second response of the mobile application to the second set of user behaviors.

26. The system of claim 22, wherein performing the static analysis on the application comprises analyzing the application manifest.

27. The system of claim 22, wherein the emulated user behaviors trigger the registered application permissions using at least one of the emulated user inputs.

28. The system of claim 21, wherein the emulated environment comprises one or more unrelated mobile applications executing concurrently alongside the mobile application.

29. The system of claim 28, further comprising:
  analyzing an effect of the one or more unrelated mobile applications on the mobile application being tested, the effect comprising at least one of:
    a change in utilization of a processing resource of the emulated environment, and
    a change in utilization of a memory resource of the emulated environment.

30. The system of claim 21, wherein the emulated environment comprises an emulated mobile operating system and applications installed on the emulated operating system.

* * * * *